Figure 1:
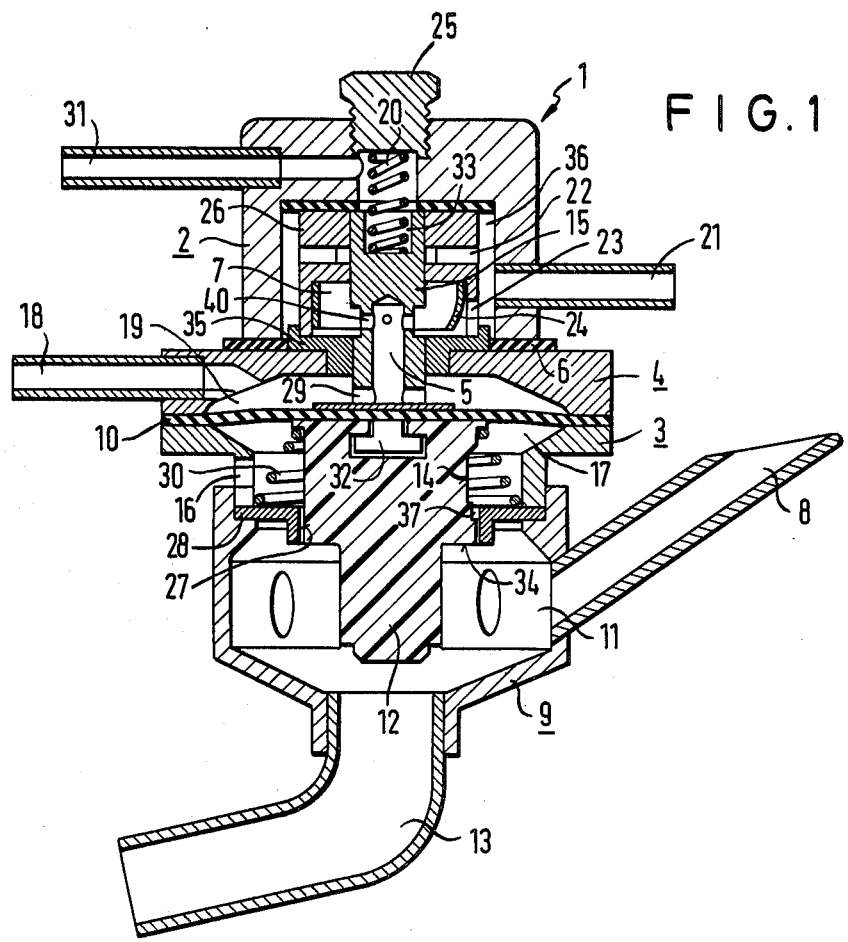

United States Patent [19]

Happel et al.

[11] 4,395,971

[45] Aug. 2, 1983

[54] APPARATUS FOR MACHINE MILKING

[76] Inventors: Fritz Happel; Werner Happel, both of 8951 Baisweil 24, Fed. Rep. of Germany

[21] Appl. No.: 271,218

[22] Filed: Jun. 8, 1981

Related U.S. Application Data

[63] Continuation of Ser. No. 17,837, Mar. 6, 1979, abandoned.

[30] Foreign Application Priority Data

Mar. 8, 1978 [DE] Fed. Rep. of Germany ....... 2810087
Jul. 24, 1978 [DE] Fed. Rep. of Germany ....... 2832390

[51] Int. Cl.³ .............................................. A01J 5/10
[52] U.S. Cl. .............................. 119/14.36; 119/14.55
[58] Field of Search ............... 119/14.36, 14.54, 14.55, 119/14.37

[56] References Cited

U.S. PATENT DOCUMENTS

| | | | |
|---|---|---|---|
| 2,896,573 | 7/1959 | Schalm | 119/14.55 |
| 2,929,354 | 3/1960 | Stevens | 119/14.54 |
| 3,014,455 | 12/1961 | Flöter | 119/14.55 |
| 3,756,198 | 9/1973 | Rudle | 119/14.36 |
| 3,810,443 | 5/1974 | Bodmin | 119/14.37 |

FOREIGN PATENT DOCUMENTS

| | | | |
|---|---|---|---|
| 7296 | 1/1956 | Fed. Rep. of Germany ... | 119/14.54 |
| 907064 | 5/1960 | United Kingdom ............ | 119/14.36 |
| 271170 | 1/1978 | U.S.S.R. .......................... | 119/14.37 |

Primary Examiner—Steve Alvo

[57] ABSTRACT

An apparatus and method for machine milking utilizing milking cups the internal spaces of which are defined by teat rubbers for receiving the teats of an animal the inner spaces of the teat rubbers are connected via a duct and a milk collecting chamber to a source of partial vacuum while the teat rubbers are externally subjected to periodically varying pressure in order to produce periodic opening and collapsing of the teat rubber during respective suction and relaxation pulses of said periodically varying pressure in order to effect milking.

A device including a valve member is provided in the duct between the teat rubbers and the source of partial vacuum, in particular in a wall of the milk collecting chamber and means are provided for controlling the position of this valve member in dependence on the actual quantity of milk flowing so as to define an air inlet for introducing air into the duct whereby to regulate the vacuum applied to the teats in a predeterminable inverse relationship to the flow of milk.

In a first embodiment the air introduced into the milk collecting chamber assists in controlling the position of the valve member and the valve member regulates the cross-section of the flow outlet from the milk collecting chamber. In a second embodiment the air introduced into the milk collecting chamber directly varies the vacuum prevailing therein.

1 Claim, 3 Drawing Figures

APPARATUS FOR MACHINE MILKING

This is a continuation, of application Ser. No. 017,837, filed Mar. 6, 1979, now abandoned.

The invention relates to an apparatus and to a method for machine milking and has particular reference to machine milking by means of milking cups the internal spaces of which are defined by teat rubbers for receiving the teats and which are connectable via duct means to a source of partial vacuum and wherein the teat rubbers are adapted to be externally subjected to periodically varying pressure in order to produce periodic opening and collapsing of the teat rubber during respective suction and relaxation pulses of said periodically varying pressure.

Milking methods are known in which the teat rubber inner space is continuously connected to a source of partial vacuum and partial vacuum and atmospheric pressure are periodically applied to the intermediate chamber of the milking cup so that during the suction pulse, i.e., during that period of time in which both the milking cup inner space and also the milking cup intermediate space are partially evacuated the teat rubber in general takes on its extended cylindrical form whilst, during the so-called relaxation pulse, it collapses i.e. is pressed together on account of the pressure difference prevailing beneath the teats between the milking cup inner space which is partially evacuated and the atmospheric pressure pevailing in the intermediate space of the milking cup. As teat rubbers with a relatively larger wall thickness are used in this known method a massaging force, i.e. a compressive force on the tips of the teats can be transmitted to the teats by the mentioned compression of the teat rubber beneath the teat.

It is however above all unfavourable in this known method that the cylindrical teat rubber, on account of the compression brought about by the pressure difference, cannot ensure isolation of the teat from the source of partial vacuum and also that the massaging forces which can be transmitted via the teat rubber are restricted. These disadvantages have amongst other things the consequence that a true relaxation of the teat during the relaxation pulse is no longer possible as, by reason of the vacuum that is continuously applied to the tips of the teats and the insufficient massage or teat support, the blood circulation in the teat is at least disadvantageously influenced. Furthermore, during the continuously alternating opening and collapsing of the teat rubber, a certain pumping effect arises in the teat rubber inner space and also in the subsequent milk discharge duct which has the consequence that the milk cannot continuously flow away but rather is always once again pumped upwardly in the direction of the teat and washed against the tips of the teats. Above all with large milk flows this has a negative effect.

As, in the known method, milking has to take place almost continuously at constant vacuum easily milked cows have to be milked at the same vacuum as cows which are more difficult to milk. This can have disadvantageous effects on the achievable milk yield and the health of the udder.

It is also already known to completely isolate the teat receiving space from the low pressure source during the relaxation pulse and indeed by means of a closure device arranged in the control device. This known method, in which excess pressure is applied to the intermediate space of the milking cup during the massage pulse results in a series of advantages and indeed in particular a considerably better matching of the milking process to the natural suckling of a calf. This has the consequence that the teats are cared for with simultaneous maintenance of the blood circulation in the teat and an improvement in the quantity of milk. However, particularly at very strong milk flows, undesired effects can also occur with this method.

Principal objects underlying the invention are to provide an apparatus and a method of machine of milking which give a practically complete release of the teat by isolation from the source of partial vacuum during the relaxation pulse and which allow the milking procedure to be adapted to automatically suit the individual milking characteristics of individual cows whilst ensuring a problemless discharge of milk with extensive avoidance of reverse washing effects.

Other objects and advantages of the present invention are given in and will become apparent from the present disclosure and claims.

In accordance with the present invention there is thus provided apparatus for machine milking by means of milking cups the internal spaces of which are defined by teat rubbers for receiving the teats and which are connectable via duct means to a source of partial vacuum and wherein the teat rubbers are adapted to be externally subjected to periodically varying pressure in order to produce periodic opening and collapsing of the teat rubber during respective suction and relaxation pulses of said periodically varying pressure, there being provided a device including a valve member in said duct means between the teat rubbers and the source of partial vacuum and means for controlling the position of said valve member in dependence on the actual quantity of milk flowing to define an air inlet for introducing air into the duct means whereby to regulate the vacuum applied to the teats in a predeterminable inverse relationship to the flow of milk.

The present invention also provides a method of machine milking by means of milking cups the internal spaces of which are defined by teat rubbers for receiving the teats and which are connectable via duct means to a source of partial vacuum and wherein the teat rubbers are adapted to be externally subjected to periodically varying pressure in order to produce periodic opening and collapsing of the teat rubber during respective suction and relaxation pulses of said periodically varying pressure and comprising the further step of regulating the vacuum operating on the teats in a predetermined inverse relation to the actual quantity of milk flowing by the introduction of air into the duct means.

Furthermore according to one aspect of the method there is provided a method of machine milking by means of milking cups the internal spaces of which are defined by teat rubbers for receiving the teats and which are connectable via duct means to a source of partial vacuum and wherein the teat rubbers are adapted to be externally subjected to periodically varying pressure in order to produce periodic opening and collapsing of the teat rubber during respective suction and relaxation pulses of said periodically varying pressure and comprising the further steps of sensing the quantity of milk flowing and adjusting the level of the vacuum prevailing at the inner space of the teat rubbers in a predetermined inverse relationship to the quantity of milk flowing.

By matching the level of the vacuum to the flow of milk, milking takes place in a manner which is very considerate to the animal as the maximum vacuum available from the installation is only used during the final milking phase and for animals that are hard to milk.

In contrast, for higher milk flows and animals which are easy to milk, a pronounced reduction of the vacuum applied to the teats results and indeed automatically without the necessity to make any manual adjustments.

In accordance with one aspect of the invention the air introduced into the duct means via the valve member cooperates with the means for controlling the position thereof and the valve member simultaneously controls the flow cross-section of the duct means.

By this measure of milk flow dependent control of the cross-section of the duct means leading to the source of partial vacuum it can be arranged that a flow cross-section free of liquid is avoided in the control range during the relaxation pulse. This in turn makes it possible to achieve a relaxation of the partial vacuum in the teat rubber inner space to atmospheric pressure or to a predetermined value, whilst preserving the free discharge of milk and without causing the named reverse washing effects. As a result the adhesion of the milking cup to the teats is strongly enhanced and any tendency to fall off is opposed.

Preferably the free flow cross-section is varied between a value at least substantially equal to zero and a predeterminable value which also makes possible a substantially free discharge of milk during the relaxation pulse. This range of variation is usefully adjustable.

Furthermore the advantageous possibility of automatically reducing the level of the vacuum in the suction pulse at the phase of increased milk flow becomes available so that, depending on the characteristics of any particular animal, an individual milking process can be achieved as a stronger vacuum, and thus a greater suction, automatically sets in for a nearly dry cow, or at low milk flow, than is the case with a strong milk flow.

In a preferred form of the apparatus the duct means includes a collector having a milk collecting chamber for collecting the milk coming from the individual teats of an animal and said valve member is located in the wall means defining said collector. An especially advantageous apparatus is characterized in that the means for controlling the position of the valve member includes a bias spring for biasing the valve member in a direction towards a first end position corresponding to maximum flow cross-section of the duct means at the valve member the biasing force for the valve member being so chosen that reduction of the free flow cross-section of the duct means associated with an increase in milk flow brings about an increase in pressue in the duct means at the valve which cooperates with the biasing force to bias the valve member to said first end position.

By means of this apparatus the invention can be constructionally and thus also economically particularly simply realized as, starting from a known collector with its associated control device for applying said periodically varying pressure, a minimum of conversion trouble and expense can allow practically all the advantages brought by the invention to be realized. Thus the milking apparatus used for known milking processes can be readily converted without undue difficulty to yield the benefits of the present teaching.

Preferably the valve member is constructed as a piston located within a collector for collecting milk coming from the individual teats of an animal in a milk collecting chamber having a single outlet duct the piston being coaxially movable relative to the single outlet duct and being held against said bias spring on an elastic membrane which forms a sealed joint with the milk collecting chamber. Usefully the piston is guided with play in a separating wall bounding the milk collecting chamber and the bias spring is arranged in a ventilated space between the membrane and the separating wall.

The piston surfaces on which the vacuum from the connection duct acts and also the force of the bias spring are so chosen that a force balance in favour of the bias spring occurs when the vacuum in the milk collecting chamber drops off as a result of an increased milk flow which diminishes the free flow cross-section in the connecting duct and on account of the leakage between the milk collecting space and atmosphere that is present. As a result of this force balance in favour of the bias spring the piston can no longer reach its closed position or indeed will be moved away from the closure direction so that, even during the relaxation pulse, the milk continuously has the possibility of flowing away without problem whilst a simultaneous release of the teats from the vacuum occurs.

For the purpose of obtaining a desired and if necessary increased introduction of atmospheric air into the milk collecting chamber during the relaxation pulse it can be useful to provide, at least on a portion of the piston wall that is guided in the separating wall, at least one groove which, from a specific position of the piston onwards, has the effect of introducing atmospheric air into the milk collecting chamber so that the bias spring has a stronger effect.

The force of the bias spring can in particular be varied over a specified range by means of an opposed adjustable spring so that it is possible to set or adjust the level of relaxation in the milk collecting chamber, i.e. in the teat rubber inner space, within a specified range during the relaxation pulse.

In accordance with an embodiment of the invention the piston is suspended with play from a support element of the membrane. This mechanical connection between the support element and the piston can be realized as a T-groove connection with play. This special support of the piston on the membrane is advantageous as the piston can adjust itself for guidance in the separating wall and accordingly the requirements set on the manufacturing and assembly accuracies do not need to be very high and thus a problemless operation is ensured.

In accordance with a further embodiment of the invention the milk collecting chamber is bounded directly by the membrane and the piston is preferably directly formed on the membrane or is unitarily constructed together with the membrane. As in the previously described embodiment a bias spring is also provided in this variant which biases the piston towards its end position corresponding to maximum flow cross-section of the duct means at the piston.

In order to ensure for this variant that atmospheric air is introduced into the milk collecting chamber during the relaxation pulse a control element is provided which is preferably actuated via the membrane movement and which frees a bore which leads to atmosphere from the milk collecting chamber at the onset of closure movement of the piston.

This embodiment is characterized by its special simplicity.

In a particular preferred embodiment of the apparatus the air introduced into the system via said valve member directly regulates the vacuum applied to the teats.

This embodiment results in a particularly compact and simple apparatus. This latter embodiment is also particularly suited for incorporation in a collector having a milk collecting chamber which forms part of the duct means. In this arrangement the valve member conveniently comprises a spring biased piston arranged for movement in a bore in wall means of said collector the piston having a groove in part of its periphery.

The piston is preferably provided with a peripheral step on its side adjacent the milk collecting chamber, said peripheral step being adapted to seal on said wall means and simultaneously forming an abutment for limiting the range of movement of the bias spring and the flow cross-section defined by said groove and the wall means decreases as the piston moves into the milk collecting chamber.

Usefully the bore is provided in a wall defining a closure for said milk collecting chamber.

The closure wall can conveniently be located between the base of the collector and a cover, and the space between the closure wall and the cover accomodates said bias spring and is connected to atmosphere. In turn the cover can also carry the distribution device for applying said periodically varying pressure to the teat rubbers.

In any of the above described apparatusses it can be useful to additionally provide a restriction in the duct means in the vicinity of the collector. This restriction can usefully be made adjustable and allows the cross-section of the milk discharge duct to be defined so that the level of the pressure variations in the milk collecting chamber of the collector which influence the regulation of the air introduced into the milk collecting chamber can be controlled.

The invention will now be more closely explained by way of example only with reference to the accompanying drawings; in the drawings are shown:

FIG. 1 a schematic longitudinal section of a collector including a control device for regulating the vacuum present at the teats of an animal being milked in dependence on the milk flow.

Figure 2:
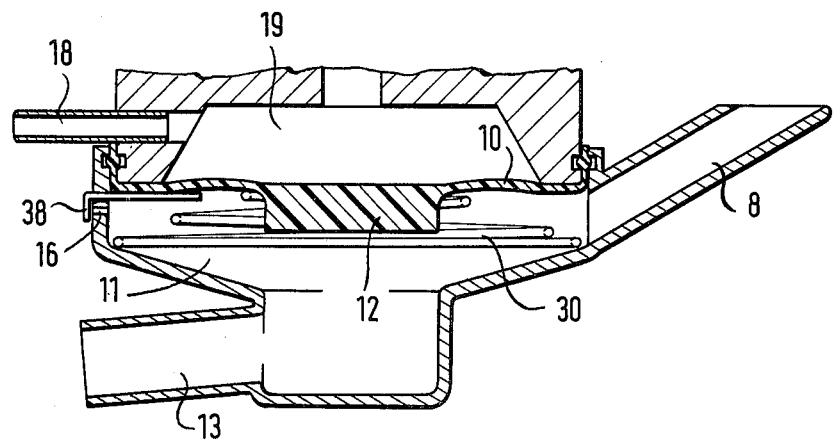

FIG. 2 a part sectional view of an alternative embodiment of the collector.

Figure 3:
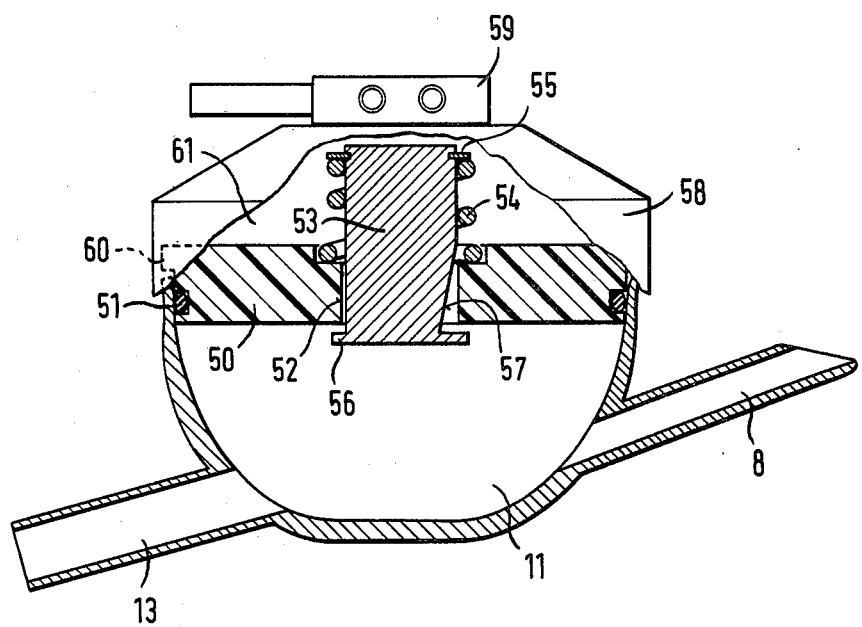

FIG. 3 a part sectional illustration of a further embodiment of a collector.

As seen in FIG. 1 a collector which is generally illustrated by the reference numeral 1 comprises a milk collecting chamber 9 with several connections 8 for joining it to the inner chambers of two chamber milk cups and a suction or connecting duct 13 to which a vacuum is continuously applied. A pneumatically actuated control device is set on top of the detachably constructed milk collecting housing 9 and a customary pulsator can be used for actuating this control device. The connections 8, the milk collecting chamber 9 and the connection duct 13 thus form duct means communicating between the teat rubbers and a source of partial vacuum. These items are not shown in the drawings but are well known per se.

The control device has a membrane 10 clamped around its periphery between two bowl-like housing parts 3 and 4 which divides the space defined between the two housing parts 3 and 4 into a lower space 17 and an upper space 19. At the centre of the membrane 10, which for example can be made of rubber, or of a fabric reinforced rubber or of a synthetic material, there is fastened a valve member in the form of a piston 12 which extends downwardly through the space 17 and into the milk collecting chamber 11. This piston 12 which is preferably made of a synthetic material is guided with play 27 in a separating wall 28 which closes the milk collecting chamber from the space 17 lying beneath the membrane 10. A control groove 14 is further provided in the piston 12 by means of which the milk collecting chamber 11 can be connected to atmosphere when the piston 12 is in its end position in which it abuts the connection duct 13 thus closing the flow cross-section through the duct means. The connection to atmosphere takes place via the space 17 beneath the membrane 10 and an aperture 16 which leads to atmosphere. The end of the duct 13 thus acts as a valve seat for the piston (or valve member) 12.

In operation periodically aternating atmospheric pressure and partical vacuum are applied to the space 19 above the membrane 10 via a connection pipe 18. The apparatus for supplying this alternating pressure is not shown but well known per se in the art.

A cup-like cover or head part 2 is set on the housing part 4 with a seal 6 therebetween. The cup-like head part 2 serves to receive a control sleeve 15 which is displaceably arranged in a guide 26 and is actuated by the membrane 10 and has, on the one hand, connections 21 for the connecting ducts to the external chambers of two chamber milking cups and, on the other hand, a connection 31 which is intended for connection to a pressure source.

A holder 35 is provided for fixing the control sleeve guide 26 in position and the holder 35 sits on the housing part 4, defines an annular space 36 between the control sleeve guide 26 and the head part 2 and apart from this takes over the function of the guide sleeve at the membrane end of the control sleeve.

In the upper portion of the head part 2 there is provided a recess for receiving a spring 20. This recess is axially in line with a corresponding recess 33 in the lower portion of the control sleeve 15 and the spring 20 engages with this corresponding recess 33. The spring 20 can be pretensioned in desired manner against the control sleeve 15 and thus against the membrane 10 by means of an adjusting screw 25.

In the control sleeve guide 26 there is provided a transverse bore 22 which opens into the annular chamber 36 and which is traversed by the control sleeve 15 during the course of its movement. This annular chamber 36 is connected to the outer spaces of the milking cups via the connecting ducts 21. The control sleeve guide 26 further defines, together with the holder 35, a ring like space 7 which is connected via an opening 23 having a non-return valve 24 with the annular chamber 36 and, when the control sleeve 15 is in a position corresponding to the suction pulse, is connected via a control opening 40 and an axial bore 5 in the control sleeve with the space 19 which lies above the membrane 10. Transverse openings 29 are provided at the membrane end of the control sleeve in order to ensure that the control sleeve bore 5 is not closed even when in contact with the membrane.

In the context of the invention, the form of the parts located beneath the membrane 10, in connection with the described control device, are of especial significance. The piston 12, the free end of which is able, in an end position, to close the connecting duct 13, is constructed as a stepped piston so that the annular face 34, together with the free end face of the central portion, is effective as a working surface. The piston 12, which is guided with play in the separating wall 28, is biased by means of a spring 30 away from the closure direction and the spring 30 is braced, in the exemplary embodiment shown, on the one hand on the separating wall 28 and on the other hand on an annular seat at the membrane end of the piston 12. In addition to the previously mentioned control groove 14 the piston also has a groove 37 which finishes at a predeterminable distance from the annular surface 34. An enlarged inlet flow cross-section for the atmosphere to the milk collecting chamber 11 can be provided by means of this groove 37 when a predetermined deflection of the piston in the direction of the connecting duct 13 occurs. The manner of operation of this specially constructed spring biased control piston 12 will be described in detail. At first however the manner of operation of the control device should be described in general in order to simplify comprehension of the entire system.

It has already been mentioned that alternating atmospheric pressure and vacuum are applied by means of a device which is not shown, for example by means of a pulsator, and that the connecting duct 31 is continuously connected to a pressure source which provides the pressurized air necessary for the relaxation pulse.

If a vacuum prevails in the space 19 the membrane 10 will be deflected upwardly on account of the atmospheric pressure prevailing in chamber 17 so that the piston 12 frees the connecting duct 13 and the control sleeve 15 is displaced axially upwardly. A connection is thus produced between the outer chambers of the two chamber milking cups with the space 19 which is evacuated or at a low pressure via the connecting ducts 21, the openings 23, the non-return valve 24, the control sleeve opening 30 and the control sleeve bore 5 together with the openings 29. The opening 22 in the control sleeve guide 26 is thus closed by the control sleeve 15 so that the transmission of pressurized air to the milking cup external chambers is not possible.

If atmospheric pressure is introduced into the space 19 then atmospheric pressure is present both in the space 19 and also in the space 17 so that, on account of the low pressure prevailing in the milk collecting chamber 11 which acts against the force of the spring 30 and, supported by the spring 20, the membrane 10 moves downwardly in the direction of the connecting duct 13. During the course of the deflection of the membrane 10 downwardly, i.e. during the last part of this movement, the control edge formed by the end of the control sleeve 15 crosses the transverse bore 22 in the control sleeve guide 26 so that a flow path from the pressure supply duct 31 to the milking cup external chambers is freed via the opening 22, which if necessary is formed as a restriction, the annular chamber 36 and the connecting duct 21. The two previously described procedures occur continuously one after the other during the alternating application of atmospheric pressure and vacuum to the space 19.

In the following the cooperation of the piston 12 which is guided with play in the separating wall and the bias spring 30 is explained.

The bias spring 30 opposes the downward movement of the membrane 10 and thus of the piston 12. The vacuum provided via the connecting duct 13 generates a downwardly directed force via the endface of the piston 12 and its annular surface 34 and indeed this force depends on the prevailing size of the vacuum in relation to atmospheric pressure. If now the space 19 is charged with atmosphere or excess pressure than a downwardly directed closing force forms on the piston 12 which is made up of the differential pressure which acts on the pressure responsive surfaces of the piston and also the force of the pressure spring 20 which presses on the membrane 10 via the control sleeve 15. The pressure of this spring 20 can be varied within a defined range by means of the adjusting screw 25 associated with the spring 20.

A certain flow from the atmosphere into the milk connecting chamber 11 continuously occurs via the play 27 between the piston 12 on the separating wall 28. This desired leakage is intentionally raised by the additional groove 37 which becomes effective after a certain downward movement of the piston 12 and indeed before the more pronounced control groove 14 becomes effective. A air inlet is thus defined from the space 17 into the milk collecting chamber 9 and its instantaneous size, which controls the rate at which air is introduced into the milk collecting chamber, depends on the relative positions of the piston 12 and the transverse wall 28.

If either no or only very little liquid flows through the connecting duct 13 then these leakages have practically no effect as they are negligible in relation to the large suction cross-section and cannot bring about any noticable dropping off of the vacuum with reference to the adjusted size of the main power source. For a stronger throughflow of liquid the cross-section of the duct 13 is however so changed that a reduction of the vacuum level in the connecting chamber 11 results. The customarily used connecting ducts have a diameter of approximately 13 mm and for a diameter of this size the described effect already pronouncedly occurs. If however a connecting duct with a larger or smaller diameter is used then the leakages must be correspondingly chosen.

Because of the reduction of the vacuum brought about by the flow of milk a smaller force works on the pressure loaded surfaces of the piston 12 which has the consequence that the force relationships change in favour of the bias spring 30 which thus regulates the downward movement of the piston in dependence on the throughflow of milk.

This bias spring 30 is preferably so chosen that the lifting force that it generates is larger than the tensile force created by vacuum on the free endface of the piston 12 associated with the connecting duct 13 so that a lifting of the piston from its closed position is ensured after the end of the milking process. Thus special release or lever devices become superfluous.

In the embodiment of FIG. 2 the piston 12 is formed in one piece with the membrane 10 and is likewise biased away from its closed position by a spring 30. As in this case a special guide of the piston 12 in a cylinder wall is not necessary then precautions must be taken to ensure that air is introduced into the milk collecting chamber 11 during the relaxation pulse. This can usefully take place in dependence on the membrane movement as is illustrated in exemplary and schematic manner by a control lever 38 which rocks about an arcuate surface and cooperates with an opening 16 which is closed during the suction pulse and intentionally opened during the massage pulse.

In this embodiment the changing of the closure force becomes larger as the area of the membrane on which the changing differential pressure operates is made larger.

In principle it is possible to allow the leakage to atmosphere which is achieved via the opening 16 to continuously take place however this leakage is preferably controlled in the described manner in dependence on the downward movement of the membrane 10.

In both the above described embodiments the air introduced into the milk collecting chamber can be said to indirectly control the level of vacuum prevailing at the teats of the animal because this air assists in controlling the position of the valve member or piston which produces a physical restriction of the free flow cross-section of the duct means and thereby influences the vacuum applied to the teats of the animal. It is also possible to use the air introduced in the system to directly vary this vacuum. An embodiment of this kind is shown in FIG. 3.

Turning now to FIG. 3 there can be seen a partial axial sectional illustration of a collector having a milk collecting chamber 11. As before connectors 8 are provided for conducting milk from the milking cups to the milk collecting chamber via milk hoses (not shown) and a connecting duct 13 leads from the milk collecting chamber to a source of partial vacuum. The milk entering the chamber via the connections 8 all leaves via the common connection duct 13.

The milk collecting chamber 11 is closed at its upper end by a transverse wall 50 and a seal 51 is arranged between this transverse wall 50 and the milk collection chamber 11.

A valve member in the form of the piston 53 is guided in a bore 52 which is preferably centrally located in the transverse wall 50. A spring 54 biases the piston in an upward direction away from the milk collecting chamber. The spring 54 is located on the one hand on an abutment on the transverse wall 50 and on the other hand on an abutment in the form of a spring ring 55 which is provided on the piston 53.

The piston 53, at its end projecting into the milk collecting chamber 11, has a peripheral step 56 of larger diameter than the bore 52 and this peripheral step is able to seat in sealing contact with the transverse wall 50. The peripheral step thus acts as a closure and abutment member. The closure function of the peripheral step 56 is of significance when the milking cups have been removed from an animal as the collecting chamber 11 is then closed due to the effect of the spring 54 and a loss of milk from the chamber is accordingly prevented.

The piston 53 is provided in the region of the bore 52 with an external groove 57 which preferably has an increasing cross-section in the direction of the collecting chamber 11. The flow cross-section of the air inlet defined between the groove and the transverse wall thus decreases as the piston moves into the milk collecting chamber. The length of the groove is so chosen that when the piston 53, on account of the vacuum forming in operation in the collecting chamber 11, is drawn into the collecting chamber by an amount corresponding to the application of the maximum operational vacuum against the force of the spring 54 the bore 52 is effectively closed and thus practically no air is able to enter the milk collecting chamber.

The transverse wall 50 forms a closure for the milk collecting chamber and is itself located between the base of the milk collecting chamber and a cover 58. A clearance 60 is provided between the cover 58 and the closure 50 in order to ensure that the space 61 defined between the cover and the closure, which serves to accommodate part of the piston the spring 54, is always at atmospheric pressure.

In conventional manner the cover 58 carries a control or distribution device 59 for periodically applying the periodically varying pressure to the teat rubbers.

In operation the piston 53 is first of all drawn by the vacuum in the milk collecting chamber 11 against the force of the spring 54 into the milk collecting chamber to the extent that the milk collecting chamber is at least substantially separated from the atmosphere. As a result of the milk flow that is achieved the free flow cross-section in the duct 13, i.e. that portion of the cross-section of the duct that is not filled with milk, is diminished so that a reduction of the vacuum in the collecting chamber 11 takes place. The greater the flow of milk the more pronounced is the reduction of vacuum. On reduction of the vacuum the piston 53 is moved upwardly on account of the bias working of the spring 54 whereby the air inlet 57 increases in size so that an increased rate of flow of air into the chamber 11 occurs which once more has the desired consequence that the vacuum applied to the teats via the connections 8 is diminished and indeed in dependence on the size of the milk flow.

By this measure which is of very simple construction it is thus possible to achieve a desired functional control of the vacuum prevailing in the teats in dependence on the flow of the milk therefrom so that the level of vacuum compulsarily matches itself to the "milkability" of the animal and a milking process individually and automatically matched to the individual animal is ensured.

It will be appreciated that the inverse predetermined relationship set up between the air introduced into the milk collecting chamber and the quantity of milk flowing is determined by controlling the size of the air inlet, and thus of the quantity of air introduced into the milk collecting chamber, for different positions of the piston or valve member.

It is important in all embodiments that a milk dependent control of the valve member results by reason of the cooperation of opposed forces which is achieved by making at least one of the forces operatively dependent on the strength of the milk flow so that the relationships can be continuously so chosen that optimum conditions prevail which, in particular during the relaxation pulse, bring the closest possible resemblance to the conditions prevailing during natural calf suckling and thereby ensure a secure retention of the milk cups on the teats.

It will be appreciated that further modifications of the present apparatus and method will be apparent to those skilled in the art without departing from the scope and spirit of the present teaching.

We claim:

1. An apparatus for machine milking by means of milking cups and teat rubbers located in those cups comprising:
    a housing;
    means on said housing for applying periodically varying pressure on the outsides of the teat rubbers to produce sequential opening and collapsing of the teat rubbers to create a succession of suction and massage pulses respectively;
    a milk collecting chamber defined in said housing;
    a connecting duct fluidly connected to said milk collecting chamber, said connecting duct having a vacuum continuously applied thereto, said connecting duct being sized, at least at one point, so that the vacuum prevailing therein varies inversely in relation to the amount of milk flowing into said connecting duct from said milk collecting chamber;

a milk collecting conduit fluidly connecting said milk collecting chamber to an inner chamber of a milking cup so that suction from said connecting duct can be applied to a milking cup inner chamber;

valve means mounted in said milk collecting chamber for attenuating and relieving suction applied to an animal during a massage pulse as a function of the amount of milk flowing through said connecting duct by admitting controlled amounts of air into said milk collecting chamber to control the amount of suction applied to the milk cup inner chamber via said connecting duct and said milk collecting chamber and wherein the amount of suction applied to an animal is varied continuously by said valve means inversely to the amount of milk produced by the animal, said valve means including:

aperture means in said housing, said aperture means being fluidly connected directly to atmosphere so that atmospheric air can be admitted into said milk collecting chamber, a piston movably mounted in said milk collecting chamber so that a surface of said piston is exposed to the suction generated in said milk collecting chamber via said connecting duct, biasing means connected to said piston biasing said piston against the force applied to said piston as a result of the suction in said milk collecting chamber, and air duct means defined by said piston defining air paths through which air passes into said milk collecting chamber, said air duct means being sized and located so that the amount of suction applied to an animal during a massage pulse is attenuated and relieved by adding air to said milk collecting chamber in controlled amounts to continuously control the amount of suction applied to an animal inversely to the amount of milk being generated by that animal.

* * * * *